No. 749,078. PATENTED JAN. 5, 1904.
O. MEYER.
PROCESS OF MANUFACTURING ETHER.
APPLICATION FILED JAN. 31, 1903.
NO MODEL.
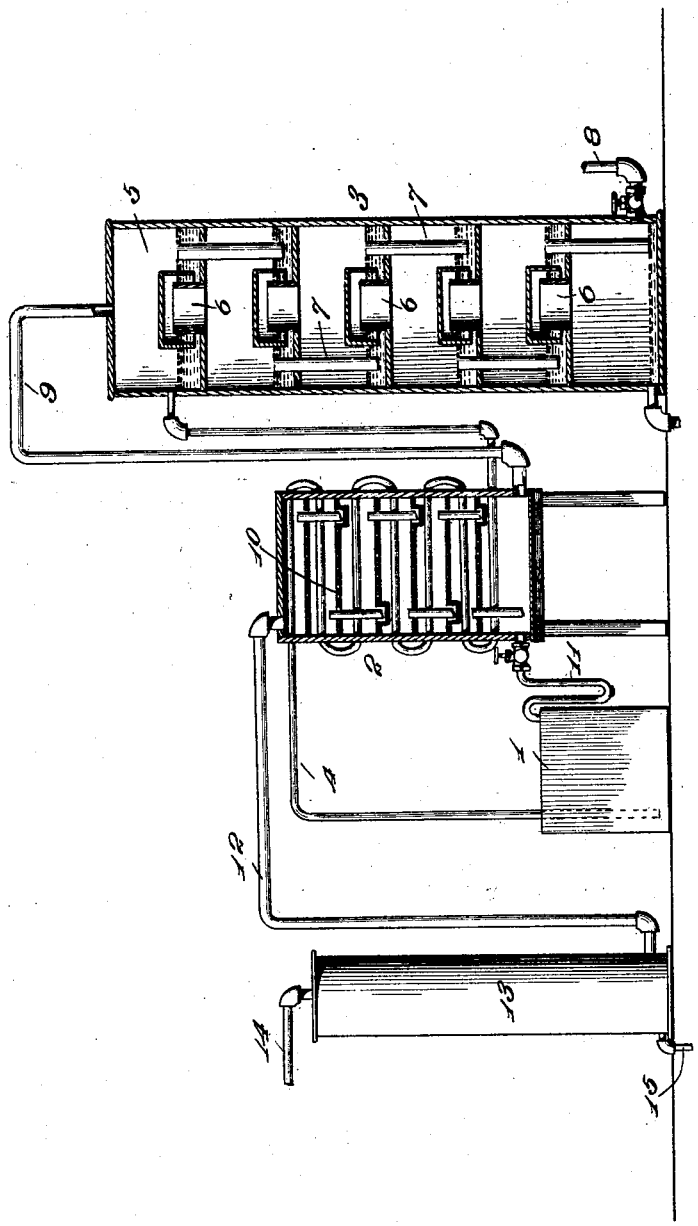

No. 749,078. Patented January 5, 1904.

UNITED STATES PATENT OFFICE.

OTTO MEYER, OF RICHMOND, VIRGINIA.

PROCESS OF MANUFACTURING ETHER.

SPECIFICATION forming part of Letters Patent No. 749,078, dated January 5, 1904.

Application filed January 31, 1903. Serial No. 141,351. (No specimens.)

*To all whom it may concern:*

Be it known that I, OTTO MEYER, a citizen of the United States, residing at Richmond, in the county of Henrico and State of Virginia, have invented certain new and useful Improvements in Processes of Manufacturing Ether; and I do hereby declare the following to be a full, clear, and exact description of the invention, such as will enable others skilled in the art to which it appertains to make and use the same.

This invention relates to improvements in the manufacture of ether and in connection therewith of ethyl-sulfuric acid; and it consists in the process of obtaining ether which involves the economical production of ethyl-sulfuric acid directly from the materials usually employed in the formation of alcohol and instead of forming alcohol continuing the process directly for forming ether.

The processes by which ether is usually manufactured generally start with the manufacturing of ethyl-sulfuric acid or hydrogen ethyl-sulfate, from which ether is made by adding alcohol to the hot ethyl-sulfuric acid or hydrogen ethyl-sulfate, by which the latter is decomposed into ether and sulfuric acid. When ether is made from alcohol, ethyl-sulfuric acid is formed according to the following equation:

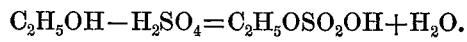
$$C_2H_5OH - H_2SO_4 = C_2H_5OSO_2OH + H_2O.$$

By the further addition of alcohol to the hot ethyl-sulfuric acid the latter is decomposed into ether and sulfuric acid.

By another process for manufacturing ether gases which contain ethylene are washed by hot sulfuric acid, whereby the ethylene combines with sulfuric acid, forming ethyl sulfuric acid, which then being subjected to distillation in a special way furnishes ether.

By a third method of manufacturing ether a start is made from acetylene gas. This gas is first transformed by nascent hydrogen into ethylene gas, and the ethylene again is absorbed by hot sulfuric acid, so as to produce ethyl-sulfuric acid, from which by further distillation ether is obtained.

It will be obvious that a cheap economical manufacture of ether can be accomplished if ethyl-sulfuric acid can be produced cheaply.

With this end in view my improvement in manufacturing ether consists in manufacturing ethyl-sulfuric acid in the most direct and inexpensive manner from those materials which are commonly used for the manufacture of alcohol—namely, from corn, grain, potatoes, saccharine matter, &c. I proceed as if manufacturing alcohol in the usual way by fermentation and distillation; but when distilling instead of cooling and condensing the vapors thus derived, so as to form alcohol, they are led into or washed or scrubbed by sulfuric acid, so as to form at once ethyl-sulfuric acid. When ethyl-sulfuric acid is thus produced, the process is continued by further distillation, so that ether is obtained. It will thus be observed that a direct and economical method of obtaining ether from corn, grain, potatoes, saccharine matter, and the like is accomplished by my improved process.

In the accompanying drawing the figure illustrates an apparatus, partially in section and partially in elevation, which is adapted for carrying out the process above described.

In referring to this illustration 1 indicates a well or receptacle for holding the fermented wash from which the alcoholic vapors are to be obtained, this wash having been formed by the fermentation of corn, grain, potatoes, or other saccharine matter. Adjacent to the well is a rectifier 2 and an analyzer 3. The wash from the well 1 is pumped or forced in any suitable manner through piping 4 to the upper part of the analyzer 3, the said piping 4 being first passed back and forth through the rectifier 2 for assisting in condensing the alcoholic vapors therein. The analyzer 3 is preferably constructed like the ordinary Coffey still analyzer, having a series of compartments 5 formed therein, the floors of which form partitions between said compartments and are provided with central capped openings 6, through which the vapors rise from one compartment to the other. The wash passes from one floor to the other through the usual pipes or tubes 7. Steam is introduced through a pipe 8 into the lower end of the analyzer 3 and in passing upwardly through the analyzer takes up the alcoholic vapors in the usual manner from the fermented wash. The alcoholic and watery vapors are conducted from the upper end of the analyzer 3 through a pipe 9 into the lower end of the rectifier 2. The rectifier may be made of any suitable pattern, but is preferably formed like the lower half of the rectifier used in the ordinary Coffey still. Such a rectifier is generally provided with perforated diaphragms 10, forming separate compartments within the rectifier and assisting in the separation of the watery vapors from the alcoholic vapors. The liquids collected in the bottom of the rectifier may be led back into the well 1 through a pipe 11, controlled by any suitable cock, as illustrated. The alcoholic and watery vapors from the rectifier 2 are led through a pipe 12 into a tower 13. This tower is preferably formed like a Glover's tower and may be filled with pieces of coke or other substances, over which sulfuric acid is permitted to trickle, so as to be thoroughly brought into contact with the alcoholic vapors introduced into said tower. The sulfuric acid is introduced through a pipe 14 at the top of the tower. The ethyl-sulfuric acid formed by thus scrubbing the alcoholic and watery vapors with the sulfuric acid in the tower is then led from the tower through a pipe 15 into any suitable mechanism for continuing the distilling operation and obtaining ether from the ethyl-sulfuric acid.

It will be evident from this description that I may proceed in the ordinary manner for obtaining alcohol from corn, grain, potatoes, saccharine matter, or the like; but instead of condensing the alcoholic vapors I mix or scrub them with sulfuric acid for forming ethyl-sulfuric acid and then continue the process to make ether.

It will be observed that the apparatus must be different, as well as the process, from that employed in producing alcohol from such sources, since the alcoholic vapors, while charged to some extent with watery vapor, are turned aside, and instead of being condensed for forming alcohol, as in the usual process, are brought into contact at once with sulfuric acid.

Having thus fully described my invention, what I claim as new, and desire to secure by Letters Patent, is—

The process of obtaining ethyl-sulfuric acid for the formation of ether, which consists in fermenting materials containing carbohydrates, separating and distilling the wash thus produced and bringing the vapors distilled directly into contact with sulfuric acid.

In testimony whereof I hereunto affix my signature in presence of two witnesses.

OTTO MEYER.

Witnesses:
R. E. GLOVER,
THOS. G. PRETTOW.